United States Patent

[11] 3,586,871

[72] Inventor Harold Seidel
Warren Township, Somerset County, N.J.

[21] Appl. No. 827,423
[22] Filed May 23, 1969
[45] Patented June 22, 1971

[73] Assignee Bell Telephone Laboratories
Murray Hill, Berkeley Heights, N.J.

[54] PHASE RESPONSIVE SWITCHING SYSTEM
6 Claims, 5 Drawing Figs.

[52] U.S. Cl. ........................................................ 307/87,
307/127, 333/2, 333/6, 343/100, 343/853, 343/854, 343/876

[51] Int. Cl. ........................................................ H02j 1/00,
H01q 3/24

[50] Field of Search ............................................ 343/208,
853, 854, 876; 333/6, 2; 307/87, 127

[56] References Cited

UNITED STATES PATENTS

| | | | |
|---|---|---|---|
| 3,028,593 | 4/1962 | Alford .......................... | 343/17.1 |
| 3,276,018 | 9/1966 | Butler ........................... | 343/100 |

*Primary Examiner*—Richard A. Farley
*Assistant Examiner*—R. Kinberg
*Attorneys*—R. J. Guenther and Arthur J. Torsiglieri

ABSTRACT: The power derived from N identical power amplifiers are combined in any one of N different output ports by controlling the relative phases of the signals propagating along N different transmission lines energized, respectively, by the N amplifiers. In particular, the N output ports are longitudinally distributed along said lines, and are coupled thereto through networks that are responsive to a different mode of excitation, where each mode is a different arrangement of input signal phases. It is an advantage of such a system that all the switching is done in the amplfiiers' relatively low-power input circuits rather than in the high-power output circuits.

INVENTOR
H. SEIDEL
BY
Sylvan Sherman
ATTORNEY

PHASE RESPONSIVE SWITCHING SYSTEM

This invention relates to alternating current switching arrangements.

BACKGROUND OF THE INVENTION

Modern radars effect high-speed scanning by means of multiface, phased-array antenna systems. Typically, in such a system, a plurality of two, or more discrete antenna arrays are employed. Each array is energized in turn, and scans its assigned portion of the azimuth.

Inherent in such a system is the need for a high-speed switch for sequentially coupling the transmitter to each of the respective arrays. Where the final stage in the transmitter is a single high-power amplifier, there is no alternative to including the switching network in the high-power portion of the circuit between the single output stage and the antennas. This presents very serious problems, however, which, advantageously, can be avoided in a system wherein the total output power is developed in a plurality of separate, parallel-connected power amplifiers. In particular, the present invention describes a switching arrangement for switching the output power, derived from N separate power amplifiers, among N, or fewer separate output terminals by controlling the phase of the low-power input signals to said amplifiers.

SUMMARY OF THE INVENTION

In accordance with the present invention, the power derived from N identical power sources are combined in any one of N different output ports by controlling the relative phases of the signals propagating along N different transmission lines energized, respectively, by the N amplifiers. In particular, the N output ports are longitudinally distributed along said lines and are coupled thereto through networks that are responsive to a different mode of excitation, where each mode is a different arrangement of input signal phases. For example, the first network is made responsive to the zeroth order mode, wherein the N lines are excited in phase. The second and successive networks are responsive to successively higher order modes of excitation wherein the relative phases of the input signals are given by $$\frac{(360)\,(m)}{N}n$$

where *m* assumes all integral values between 0 and N−1 inclusively, for each mode order *n*, and
where *n* assumes all integral values between zero and (N−1), inclusive.

It is an advantage of the invention that all switching is done in the relatively low-power input circuit, rather than in the high-power output circuit.

These and other objects and advantages, the nature of the present invention, and its various features, will appear more fully upon consideration of the various illustrative embodiments now to be described in detail in connection with the accompanying drawings.

BRIEF DESCRIPTION OF THE DRAWINGS

Referring to the drawings, FIG. 1 shows a switching system in accordance with the invention wherein the output signals from N different signal sources, of which four, 10, 11, 12 and 13, are shown, are selectively combined in any one of N different output ports, of which ports 1, 2 and N are shown. More specifically, signal sources 10—13 are high-power amplifiers driven by a common signal source 14. The latter is coupled to the several amplifiers through adjustable phase shifters 15, 16, 17 and 18 for reasons which will be explained in greater detail hereinbelow.

Figure 1:
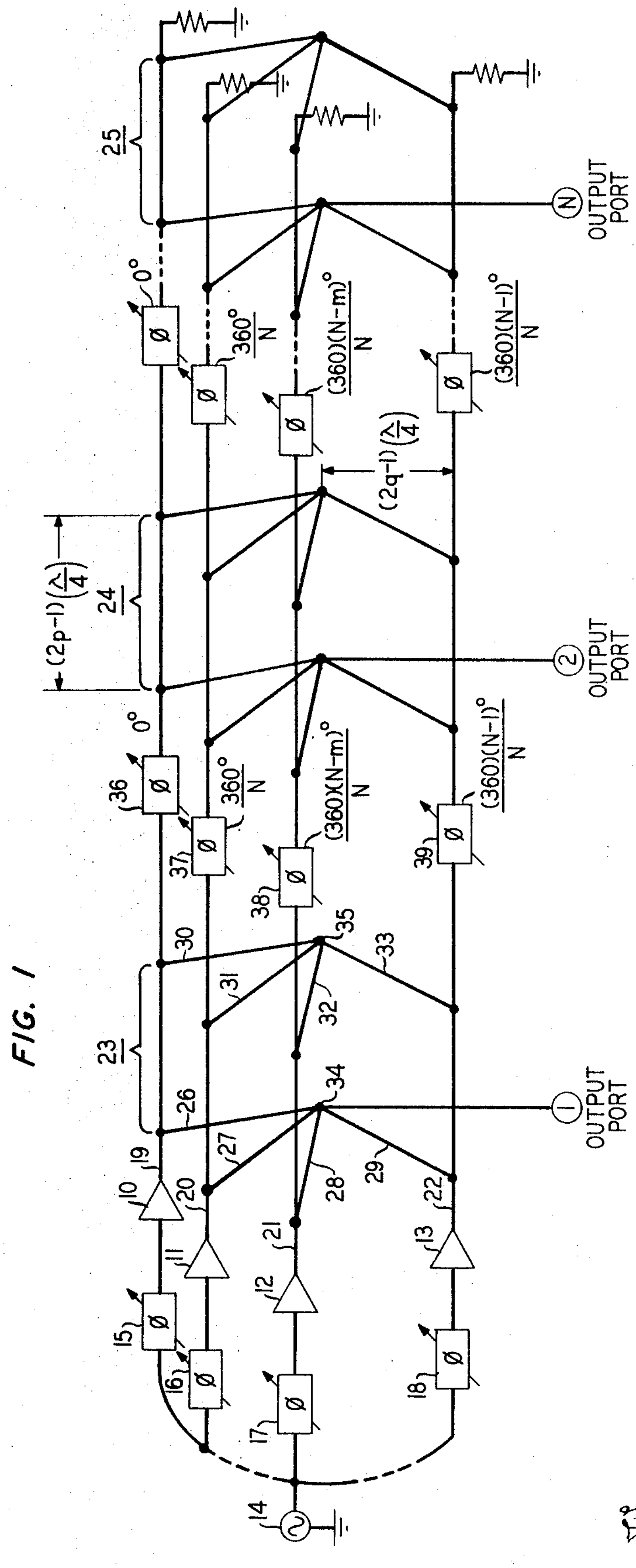
FIG. 1 shows an N-terminal switching arrangement in accordance with the invention.

The output from each amplifier is coupled to a different one of N transmission lines, of which lines 19, 20, 21 and 22 are shown. The lines, which can have any arbitrary length, are advantageously match-terminated at their respective ends to avoid spurious signals due to reflections.

Longitudinally distributed along the transmission lines are the N output networks, of which networks 23, 24 and 25 are shown. Each network includes two clusters of quarter-wave stubs, spaced apart a quarter of a wavelength. More specifically, each of the two clusters comprises N stubs, each one of which is connected in shunt with a different one of the N transmission lines. Thus, referring to network 23, the first cluster comprises a first group of N stubs, of which stubs 26, 27, 28 and 29 are shown, connected in shunt with transmission lines 19, 20, 21 and 22, respectively. The second cluster comprises a second group of N stubs, of which stubs 30, 31, 32 and 33 are shown, likewise connected in shunt with lines 19, 20, 21 and 22, respectively.

The ends of the stubs comprising each cluster are coupled together to form two common junctions 34 and 35. The output signal is taken at the common junction formed by the stubs in the first of the two clusters, measured along the direction of wave propagation. Thus, in output network 23, the output port is junction 34.

As indicated hereinabove, each of the output networks is intended to respond to a different mode of excitation. This is accomplished by including a mode converter between adjacent pairs of output networks for converting from one phase mode to another phase mode. As illustrated, each converter comprises a group of phase shifters located along the transmission lines, where the relative phase shifts produced by the several phase shifters in any group differ by multiples of 360/N degrees. Thus, between output networks 23 and 24 the relative phase shifts produced by phase shifters 36, 37, 38 and 29 are $$0, \frac{360}{N}, \ldots$$

$$\frac{(360)(N-m)}{N} \ldots \text{ and } \frac{(360)(N-1)}{N} \text{ degrees,}$$

where *m* is any integer between N and 1. An identical group of phase shifters is included between each pair of output networks.

Figure 2:
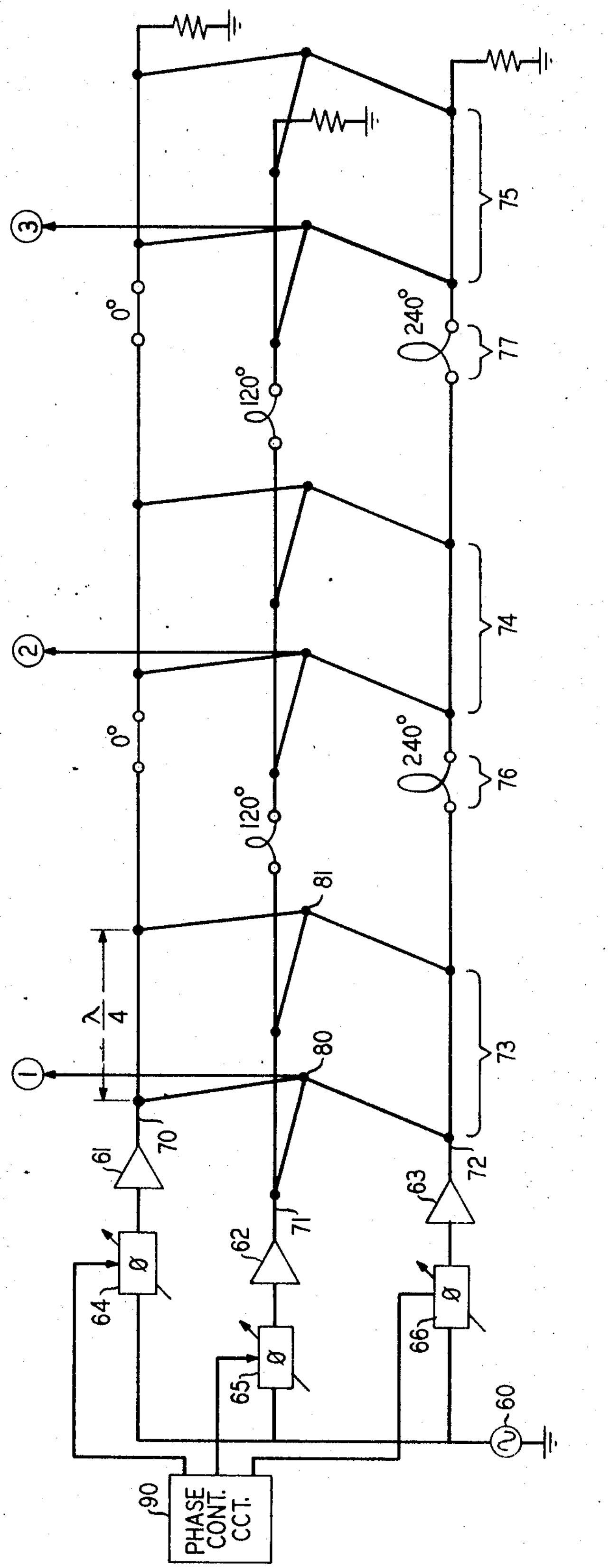
FIG. 2 shows, more specifically, a three-terminal switch.

The operation of the switching arrangement described in connection with FIG. 1 can be more conveniently explained by specifying a particular number of power sources, rather than by attempting to deal with an indefinite number. Accordingly, for purposes of explanation and illustration, a three-line system is illustrated in FIG. 2, comprising a common signal source 60 coupled to three amplifiers 61, 62 and 63 through three adjustable phase shifters 64, 65 and 66, respectively.

For a three-source system, three modes of excitation, given by 0°, 0°, 0°; 0°, 240°, 120°; and 0°, 120°, 240° are possible. Accordingly, the phase shifters are designed to produce the requisite phase combinations, as will be explained in greater detail hereinbelow.

Each amplifier is coupled to a different match-terminated transmission line 70, 71 and 72 along which there are located three output networks 73, 74 and 75. Included between adjacent networks 73—74 and 74—75 are the mode converters 76 and 77, comprising groups of phase shifters, which introduce phase shifts of 0°, 120° and 240°, respectively, in the three transmission lines.

It is apparent that in order to extract all the signal energy at any particular output port, the signals must arrive at that particular output port in phase. If they are not in phase, less than all the power will be extracted and, in particular, if they are 120° out of phase with respect to each other, they will sum to zero, and none of the incident power will be extracted. Since we seek to extract all the power at any one output port, the circuit is arranged so that the signals are in phase at only one of the output networks and 120° out of phase at all the other networks. This condition is realized by adjusting the phase shifters 64, 65 and 66 so that the amplifiers are energized in any one of three different phase modes, and by the inclusion of the phase shift groups 76 and 77 between pairs of output networks. To illustrate, table I shows the various excitation phase modes produced by phase shifters 64, 65 and 66, and the phase of the signals at the three output networks.

TABLE 1

| Excitation phase, degrees | Signal phase at output network, degrees | | |
|---|---|---|---|
| | 1 | 2 | 3 |
| 0 | 0 | 0 | 0 |
| 0 | 0 | 120 | 240 |
| 0 | 0 | 240 | 120 |
| 0 | 0 | 0 | 0 |
| 240 | 240 | 0 | 120 |
| 120 | 120 | 0 | 240 |
| 0 | 0 | 0 | 0 |
| 120 | 120 | 240 | 0 |
| 240 | 240 | 120 | 0 |

As can be seen from table I, with phase shifters 64, 65 and 66 adjusted such that the amplifiers and, hence, the transmission lines are excited in phase, the signals arrive at network 1 in phase but are 120° out of phase at networks 2 and 3. When the amplifiers are excited in the second mode, 0°, 240° and 120°, the signals are in phase at network 2, but 120° out of phase at the other two networks. Finally, excited in the 0°, 120° and 240° mode, the signals are in phase at network 3, but 120° out of phase at networks 1 and 2. Thus, by successively exciting the amplifiers in the several phase modes defined by expression $$\frac{(360)(m)}{N}n \qquad (1)$$

where, for any phase mode $n$, from zero to N−1, the signals assume the relative phases given by expression (1) as $m$ assumes all integral values between 0 and N−1 inclusively, the signal can be switched among the three output ports.

In operation, and excited in the zeroth mode, i.e., $n=0$, the signals arrive at the stub clusters of output network 73 in phase. In particular, the signals arriving at the first cluster sum, in phase, at junction 80, and all the signal energy is coupled to the output load. Any tendency for the signal to propagate past the first network is minimized by the second stub cluster which also sums the signals in phase at junction 81. However, since junction 81 appears as an open circuit to the signal, (maximum voltage, zero current), the transmission lines appear to be short circuited at the location of the second stub cluster due to the impedance transformation produced by the quarter-wave stubs. Similarly, this short circuit is reflected as an open circuit at the first stub cluster due to a second quarter-wave impedance transformation resulting from the quarter-wave spacing between the stub clusters. Thus, when the signals are in phase, the first cluster of stubs sums the signals in the several transmission lines and couples it to the output circuit. Simultaneously, the second cluster of stubs produces an open circuit along the transmission lines thereby preventing the signals from propagating past the first cluster. If, on the other hand, the signals are 120° out of phase, they sum to zero at the stubs, junctions. The stubs, as a result, appear to be short circuited at their common ends, thus reflecting an open circuit in shunt with the transmission lines and, thereby permitting the signals to propagate by.

The method for controlling the phase modes of the input signals will vary with the particular application. In FIG. 2, phase shifters 64, 65 and 66 are shown connected to a phase control circuit 90 which, typically, would be programmed to vary the signal phases automatically. Alternatively, the phase control circuit can be manually operated.

Figures 3, 4, 5:
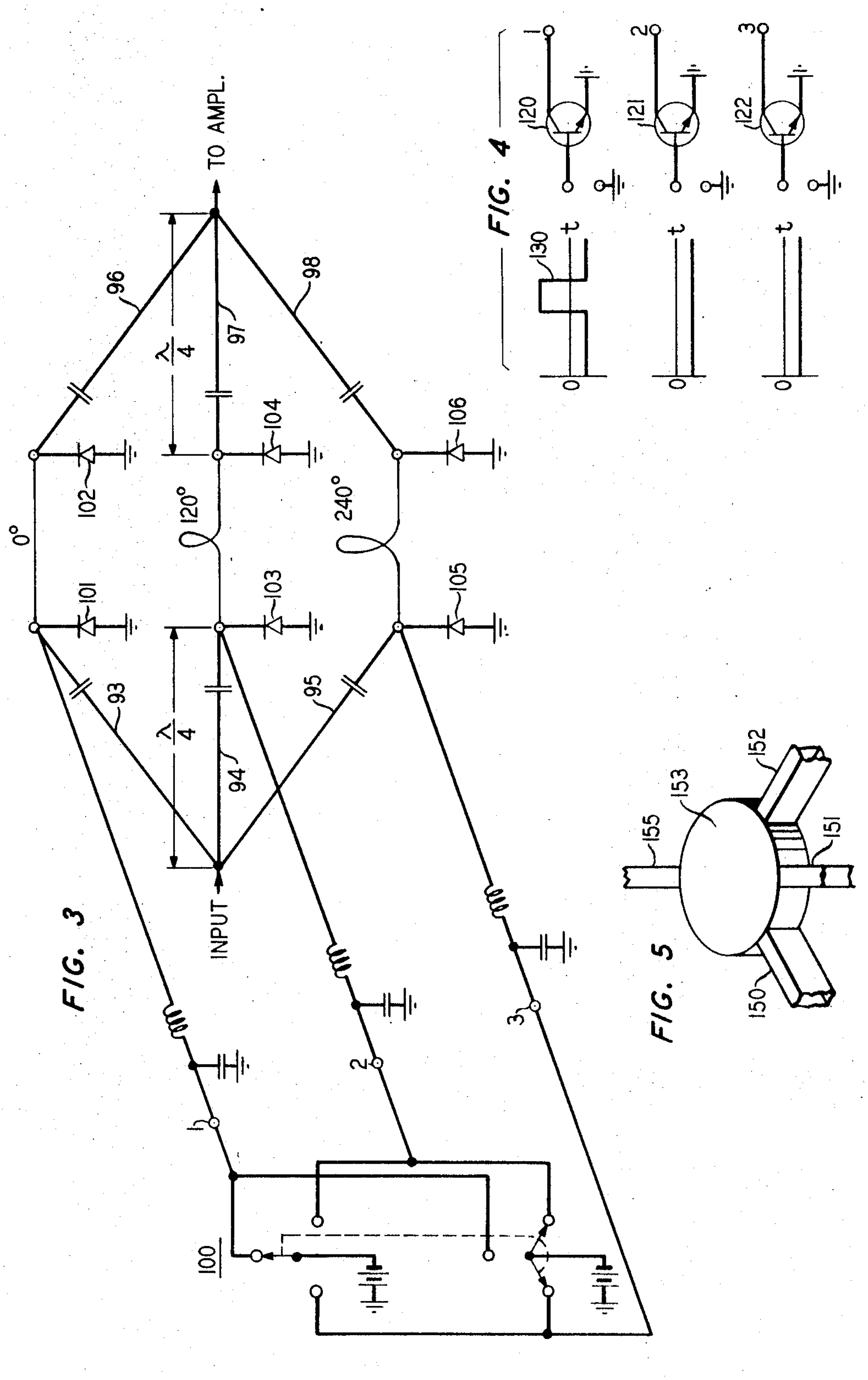
FIGS. 3 and 4 show alternate illustrative embodiments of adjustable phase shifters for use with the three-terminal switch shown in FIG. 2.
FIG. 5 shows an arrangement whereby conductively bounded rectangular waveguide stubs are coupled together to form a common junction.

FIG. 3, included for purposes of illustration, shows one embodiment of a variable phase shifter wherein three delay networks 90, 91 and 92 are connected together, at their respective ends, through quarter-wave line segments 93, 94, 95, and 96, 97, 98. In addition, the ends of the delay networks are coupled to ground through pairs of diodes 101–102, 103–104, and 105–106 which are biased in either their low- or their high-conductivity state, depending upon the phase shift to be produced. More particularly, biasing is produced by means of a switch 100 which biases one pair of diodes, associated with one of the delay networks, in a low conductivity state while, simultaneously biasing the other two pairs of diodes, associated with the other two delay networks in a high-conductivity state. As illustrated in FIG. 3, diodes 101 and 102 are biased to their low-conductivity state, while pairs of diodes 103–104 and 105–106 are biased to their high-conductivity state. The resulting low impedance produced by these diodes is transformed by the quarter-wavelength lines 94, 97, 95 and 98 to a high impedance at the input and output ends of the phase shifter. By contrast, the high impedances produced by diodes 101 and 102 are transformed as low impedances. Accordingly, the input signal propagates along delay network 90 and experiences a 0° relative phase shift. By rotating switch 100, the input signal can be directed to either one of the other two delay networks 91 or 92 to produce 120° or 240° relative phase shifts.

FIG. 4 shows an alternate switching arrangement wherein switch 100 in the diode-biasing circuit is replaced by three transistors 120, 121 and 122. In operation, all the transistors are biased "on," shorting the delay networks to ground through the diodes. The signal is directed through the appropriate delay network by applying a pulse, such as pulse 130, to one of the transistors, turning the transistor "off" and, thereby, directing the signal through the associated day network.

FIG. 5, included for purposes of illustration, shows the manner in which conductively bounded rectangular waveguide stubs can be coupled together to form a common junction. As illustrated, the stubs 150, 151 and 152 couple into a common circular cavity 153 through its side. Since the cavity will have an effective electrical length, the length of the individual stubs will have to be adjusted to take this into account in order to produce the equivalent of a quarter of a wavelength at the frequency of interest.

At an output port, an output waveguide 155 would also be included or, alternatively, a coaxial cable can be coupled to the cavity.

In the discussion of the output networks and devised variable phase shifters, reference was made to quarter-wave stubs and quarter-wave line sections. It will be understood that in each instance the stub or line section can be a quarter-wavelength long or any odd multiple of a quarter-wavelength. It will also be recognized that the particular output networks and the specific variable phase shifters described are merely illustrative. Thus, in all cases it is understood that the above-described arrangements are illustrative of only a small number of the many possible specific embodiments which can represent applications of the principles of the invention. Numerous and varied other arrangements can readily be devised in accordance with these principles by those skilled in the art without departing from the spirit and scope of the invention.

I claim:

1. A switching system for coupling power to any one of N output ports comprising:
N transmission lines;
means for energizing said lines in any one of N different phase modes;
output networks longitudinally disposed along said lines for summing the signals in said lines and coupling said signals to different output circuits;
and mode converters disposed between adjacent pairs of output networks for converting the signals propagating along said lines from one to another of said phase modes.

2. The switch according to claim 1 wherein said energizing means comprises:

a common signal source;

a plurality of N power amplifiers;

and means, including adjustable phase shifters, for coupling said common source to each of said amplifiers.

3. The switch according to claim 2 wherein the relative phases of the signals coupled to said amplifiers are given by $$\frac{(360)(m)}{N}n$$

where $n$ assumes all integral values between zero and (N−1), inclusively;

and $m$ assumes all integral values between zero and N−1, inclusively, for each value of $n$.

4. The switch according to claim 2 where each phase shifter comprises:

a plurality of N delay networks connected in parallel by means of quarter-wave line segments;

each of said networks producing a different relative phase shift given by $$\frac{(360)(N-m)}{N}$$

where $m$ assumes a different integral value between 1 and N, inclusive;

means for coupling said common signal source to one end of said parallel connected networks;

means for coupling the other end of said parallel connected networks to one of said amplifiers;

a diode connected in shunt at each end of each of said networks;

and means for switching said diodes between their high- and low-conductivity states.

5. The switch according to claim 1 wherein said mode converters comprises a group of phase shifters located along said transmission lines;

and wherein the relative phase shifts produced by said phase shifters differ by multiples of 360/N degrees.

6. The switch according to claim 1 wherein each network comprises a first and a second cluster of transmission line stubs spaced an odd number of quarter-wavelengths apart along said lines;

each of said clusters including a plurality of N quarter-wave stubs, each one of which is connected at one end to a different one of said lines and at the other end to a common junction;

the common junction of the first of said clusters along the direction of wave propagation being the output port for said network.